(12) United States Patent
Cheng et al.

(10) Patent No.: US 12,137,180 B2
(45) Date of Patent: Nov. 5, 2024

(54) OUTER FLEXIBLE SCREEN MOBILE ELECTRONIC TERMINAL AND HINGE ASSEMBLY THEREOF

(71) Applicant: Hangzhou Amphenol Phoenix Telecom Parts Co., Ltd., Hangzhou (CN)

(72) Inventors: Guanlun Cheng, Hangzhou (CN); Chenqi Zhou, Hangzhou (CN)

(73) Assignee: HANGZHOU AMPHENOL PHOENIX TELECOM PARTS CO., LTD., Zhejiang (CN)

(*) Notice: Subject to any disclaimer, the term of this patent is extended or adjusted under 35 U.S.C. 154(b) by 370 days.

(21) Appl. No.: 17/773,423

(22) PCT Filed: Oct. 12, 2020

(86) PCT No.: PCT/CN2020/120313
§ 371 (c)(1),
(2) Date: Apr. 29, 2022

(87) PCT Pub. No.: WO2021/082891
PCT Pub. Date: May 6, 2021

(65) Prior Publication Data
US 2023/0007110 A1    Jan. 5, 2023

(30) Foreign Application Priority Data

Nov. 1, 2019 (CN) .......................... 201911057639.2

(51) Int. Cl.
*H04M 1/02*    (2006.01)
(52) U.S. Cl.
CPC ....... *H04M 1/0216* (2013.01); *H04M 1/0268* (2013.01)

(58) Field of Classification Search
CPC ... H04M 1/0216; H04M 1/0268; H04M 1/022
See application file for complete search history.

(56) References Cited

U.S. PATENT DOCUMENTS

| 10,775,852 | B2* | 9/2020 | Kim | H04M 1/0268 |
| 2012/0182677 | A1* | 7/2012 | Seo | H04M 1/0268 |
| | | | | 361/679.01 |

(Continued)

FOREIGN PATENT DOCUMENTS

| CN | 205446377 U | 8/2016 |
| CN | 207075032 U | 3/2018 |

(Continued)

*Primary Examiner* — Julio R Perez
(74) *Attorney, Agent, or Firm* — Muncy, Geissler, Olds & Lowe, P.C.

(57) ABSTRACT

The present invention provides an outer flexible screen mobile electronic terminal and a hinge assembly. A composite supporting layer of a flexible screen is provided between a first side housing and a second side housing; the composite supporting layer comprises a tensile layer capable of being bent and rebounding, and a bendable and flattenable supporting layer of the tensile layer. A hinge comprises a middle supporting portion, a first side connection portion, and a second side connection portion; the outer side of the middle supporting portion is provided with an arc fitting the bending of the flexible screen, and the first side and the second side of the middle supporting portion are respectively provided with gratings; the first side connection portion and the second side connection portion are configured to be in the shape of a comb. The supporting structure of the present invention can flatten and support the flexible screen and fit the bending of the flexible screen, is simple in design and control, improves the sense of touch and protects the flexible screen, and prolongs the service life of the flexible screen.

14 Claims, 8 Drawing Sheets

(56) References Cited

U.S. PATENT DOCUMENTS

| | | | | |
|---|---|---|---|---|
| 2012/0264489 A1* | 10/2012 | Choi | ............... | H04M 1/0247 |
| | | | | 455/566 |
| 2019/0163241 A1* | 5/2019 | Moon | ............... | G06F 1/1641 |
| 2022/0287193 A1* | 9/2022 | Chun | ............... | G09F 9/30 |
| 2023/0007110 A1* | 1/2023 | Cheng | ............ | H04M 1/0268 |

FOREIGN PATENT DOCUMENTS

| | | |
|---|---|---|
| CN | 208189115 U | 12/2018 |
| CN | 110035140 A | 7/2019 |
| WO | WO 2019134696 A1 | 7/2019 |

* cited by examiner

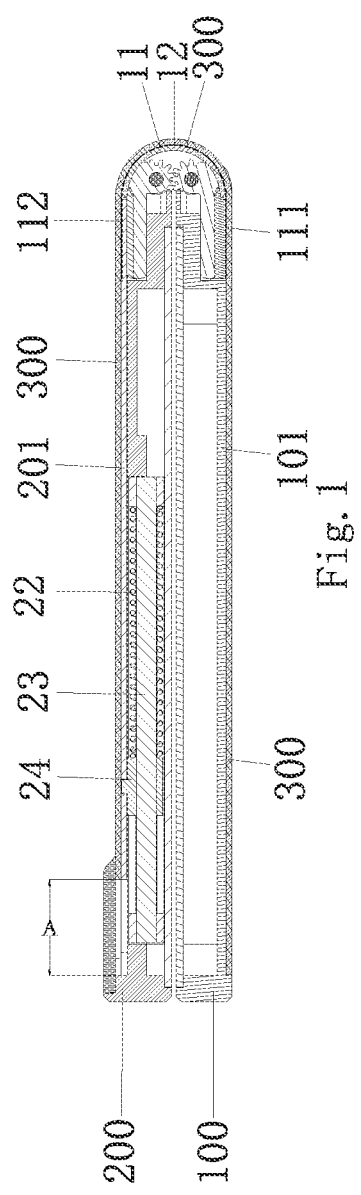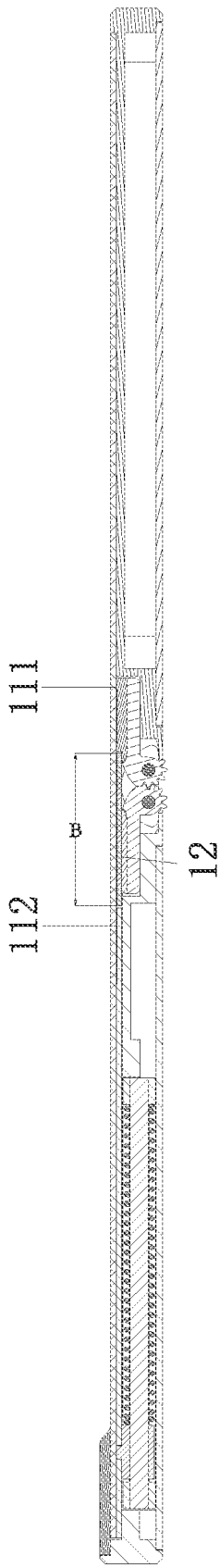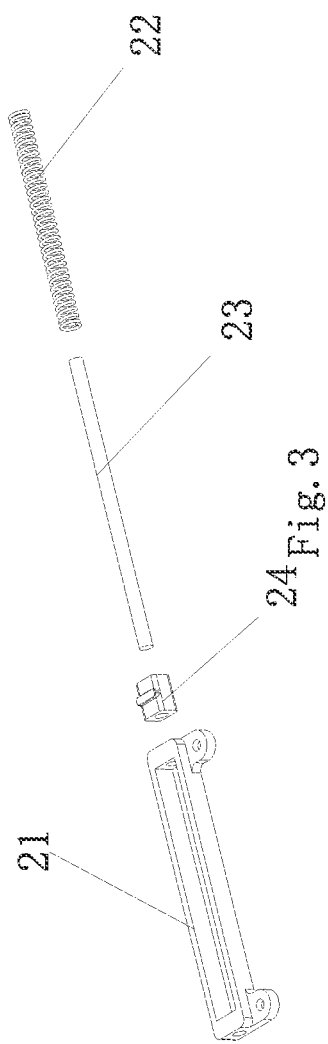

OUTER FLEXIBLE SCREEN MOBILE ELECTRONIC TERMINAL AND HINGE ASSEMBLY THEREOF

FIELD OF THE INVENTION

The present invention relates to an outer flexible screen mobile electronic terminal and a hinge assembly thereof.

BACKGROUND OF THE INVENTION

A flexible screen mobile electronic terminal includes a left housing and a right housing. The left housing is connected with the right housing by a hinge. For an outer flexible screen mobile electronic terminal, a plurality of support rods are used between housings on both side for supporting, however, it is difficult to fully fit the bending of the flexible screen when folding the mobile terminal and during the folding process, which will cause discomfort to the touch and adversely affect the service life of the flexible screen.

SUMMARY OF THE INVENTION

The technical problem to the solved first by the present invention is to provide an outer flexible screen mobile electronic terminal with better supporting effect and bending fitting effect. For this purpose, the present invention adopts the following technical solutions: An outer flexible screen mobile electronic terminal, comprising a hinge, a first side housing and a second side housing, and a flexible screen is arranged on the outer side of the outer flexible screen mobile electronic terminal, wherein a composite supporting layer of the flexible screen is provided between a first side housing and a second side housing of the outer flexible screen mobile electronic terminal, a supporting plate of the flexible screen is provided on the first side housing and the second side housing respectively, and the flexible screen supporting plate of the second side housing is arranged as a sliding plate; the composite supporting layer comprises a bendable tensile layer and a bendable and flattenable supporting layer of the tensile layer, the composite supporting layer is provided with a first side and a second side on two opposite sides respectively, so as to be connected to the first side and the second side of the outer flexible screen mobile electronic terminal, respectively, the second side of the composite supporting layer is connected with the sliding plate, and the sliding plate is connected with an elastic mechanism that pushes or pulls the sliding plate toward the second side; the flexible screen and the flexible screen supporting plate of the first side housing, the composite supporting layer, and the flexible screen supporting plate of the second side housing are connected;

The hinge is located below the composite supporting layer, and comprises a middle supporting portion, a first side connection portion, a second side connection portion and a synchronous reverse rotation connecting mechanism, the first side connection portion and the second side connection portion are rotatably mounted on a first side and a second side of a middle supporting portion respectively, the outer side of the middle supporting portion is provided with an arc fitting the bending of the arc of the flexible screen, and the first side and the second side of the middle supporting portion are respectively provided with gratings, the first side connection portion and the second side connection portions are configured to be in the shape of a comb, the comb shape of the first side connection portion comprises a fixed connection portion and combs that are inserted into the gratings of a first side of a middle connection portion respectively, the comb shape of the second side connection portion comprises a fixed connection portion and combs that are inserted into the gratings of a second side of the middle connection portion respectively, the first side connection portion is connected with the second side connection portion by a synchronous reverse rotation connecting mechanism to be capable to rotate in reverse synchronously.

On the basis of adopting the foregoing technical solution, the present invention further adopts the following technical solutions:

Both sides of the tension layer are longer than the supporting layer, the first side of the tension layer is used as the fixed side to connect with a fixed part, and the second side of the tension layer is provided with a part connecting to the sliding plate.

The tensile layer is laid above the supporting layer.

The width of the composite supporting layer matches the width of the flexible screen.

Both sides of the tensile layer are longer than the supporting layer, and when the outer flexible screen mobile electronic terminal is folded, the tensile layer has a line segment on both sides, and the first side of the tensile layer is connected to the flexible screen supporting plate of the first side housing or connected to a part of the hinge that is fixedly connected to the first side housing, and the second side of the tension layer is connected to the flexible screen supporting plate of the second side housing.

The tensile layer is laid above the supporting layer, the lower surface of the first side of the tensile layer is connected to the flexible screen supporting plate of the first side housing, and the lower surface of the second side of the tensile layer is connected to the flexible screen supporting plate of the second side housing, and the upper surface of the tensile layer is connected to the flexible screen in a fit manner.

The first side of the composite supporting layer is connected to the flexible screen supporting plate of the first side housing or connected to a part of the hinge that is fixedly connected to the first side housing, the second side of the tension layer is connected to the flexible screen supporting plate of the second side housing.

In the hinge, the first side connection portion and the second side connection portion are rotatably mounted on the first side and the second side of the middle supporting portion through the synchronous reverse rotation connecting mechanism.

In the hinge, the fixed connection portion of the first side connection portion and the fixed connection portion of the second side connection portion are respectively provided with parts that are connected to the first side housing and the second side housing of the outer flexible screen mobile electronic terminal.

The fixed connection portion of the first side connection portion is provided with a top surface, and the top surface is connected to the first side of the composite supporting layer.

The length of the middle supporting portion matches the length of the outer flexible screen mobile electronic terminal in the length direction.

The synchronous reverse rotation connecting mechanism is a sheet-like superimposed structure, which comprises a plurality of first synchronous connecting pieces with gears and a plurality of second synchronous connecting pieces with gears, the first synchronous connecting pieces are connected to the first side connection portion, the second synchronous connecting pieces are connected to the second side connection portion, the first synchronous connecting pieces and the second synchronous connecting pieces are provided in pairs, and the gears thereof are meshed or connected through an intermediate gear; the gears of the first synchronous connecting pieces and the gears of the second synchronous connecting pieces are respectively connected rotatably to the middle supporting portion through gear shafts thereof, and a supporting spacer is provided between the adjacent pairs of the first synchronous connecting pieces and the second synchronous connecting pieces, the outer side of the supporting spacer is provided with an arc fitting the bending of the flexible screen, and the end of the gear shaft is provided with an axial limit structure;

The synchronous reverse rotation connecting mechanisms are respectively provided outside the two ends of the middle supporting portion.

The gear shaft is fixedly connected to the middle supporting portion, the first synchronous connecting piece and the second synchronous connecting piece are capable of rotating relative to the gear shaft, the supporting spacer is provided with a gear shaft hole for the gear shaft to pass through and be fixedly connected to the supporting spacer.

It should be noted that the foregoing further technical solutions of the present invention can also be used in combination.

Another technical problem to be solved by the present invention is to provide a hinge assembly of the outer flexible screen mobile electronic terminal, which has better supporting effect and bending fitting effect. For this purpose, the present invention adopts the following technical solutions:

A hinge assembly of the outer flexible screen mobile electronic terminal, comprising the aforesaid hinge and the composite supporting layer, wherein the first side of the composite supporting layer is connected to the fixed connection portion of the first side connection portion, and the second side of the composite supporting layer is connected to a sliding part.

Due to the adoption of the technical solutions of the present invention, the supporting structure of the present invention can flatten and support the flexible screen and fit the bending of the flexible screen, is simple in design and control, improves the sense of touch and protects the flexible screen, and prolongs the service life of the flexible screen.

BRIEF DESCRIPTION OF THE DRAWINGS

FIG. 1 is a sectional view of an outer flexible screen mobile electronic terminal of the present invention in folded state.

FIG. 2 is a sectional view of an outer flexible screen mobile electronic terminal of the present invention in a flattened state.

FIG. 3 is an exploded view of an elastic mechanism of an outer flexible screen mobile electronic terminal according to an embodiment of the present invention.

DETAILED DESCRIPTION

Figure 4:
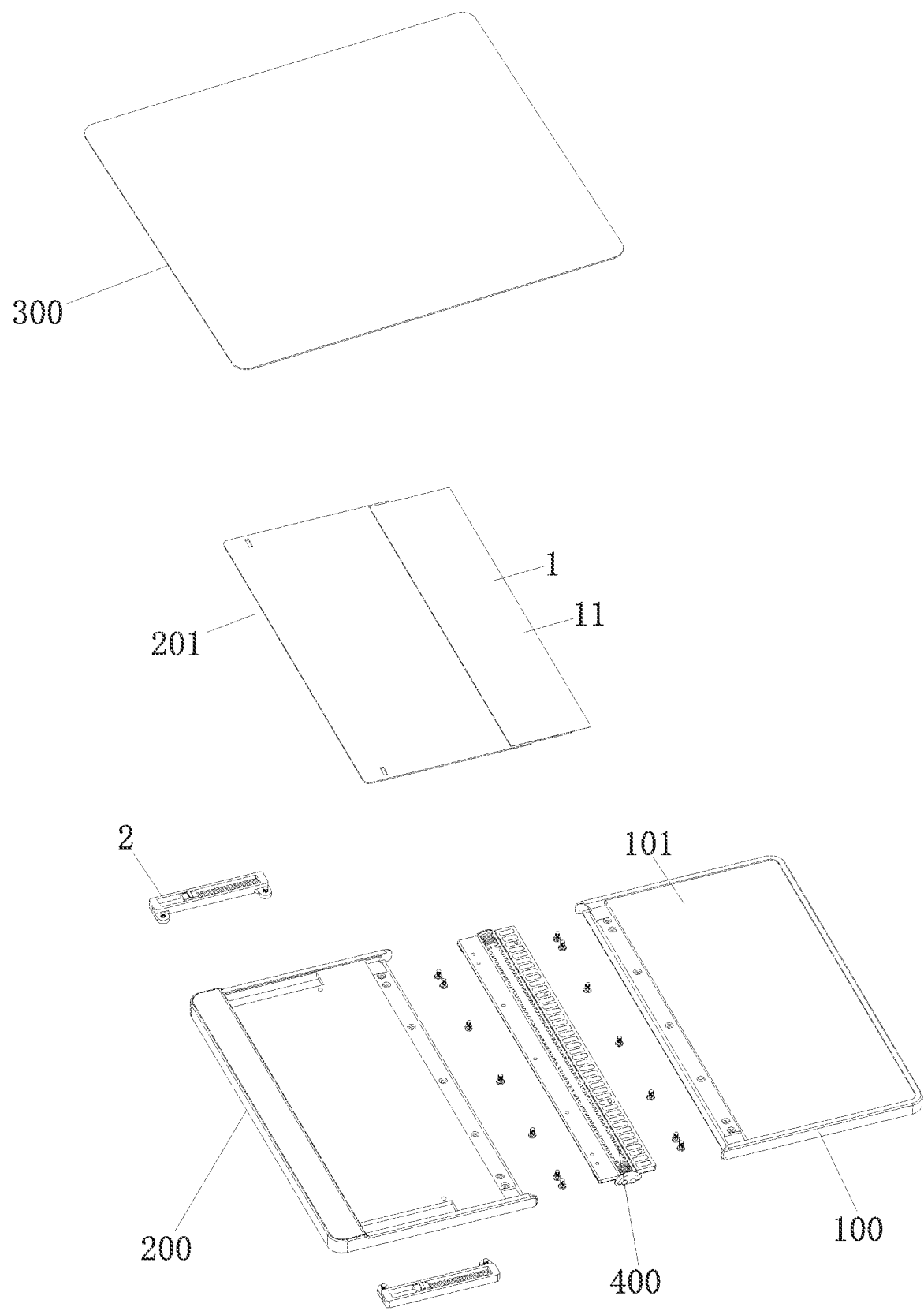
FIG. 4 is an exploded view of an outer flexible screen mobile electronic terminal according to an embodiment of the present invention.
Figure 5:
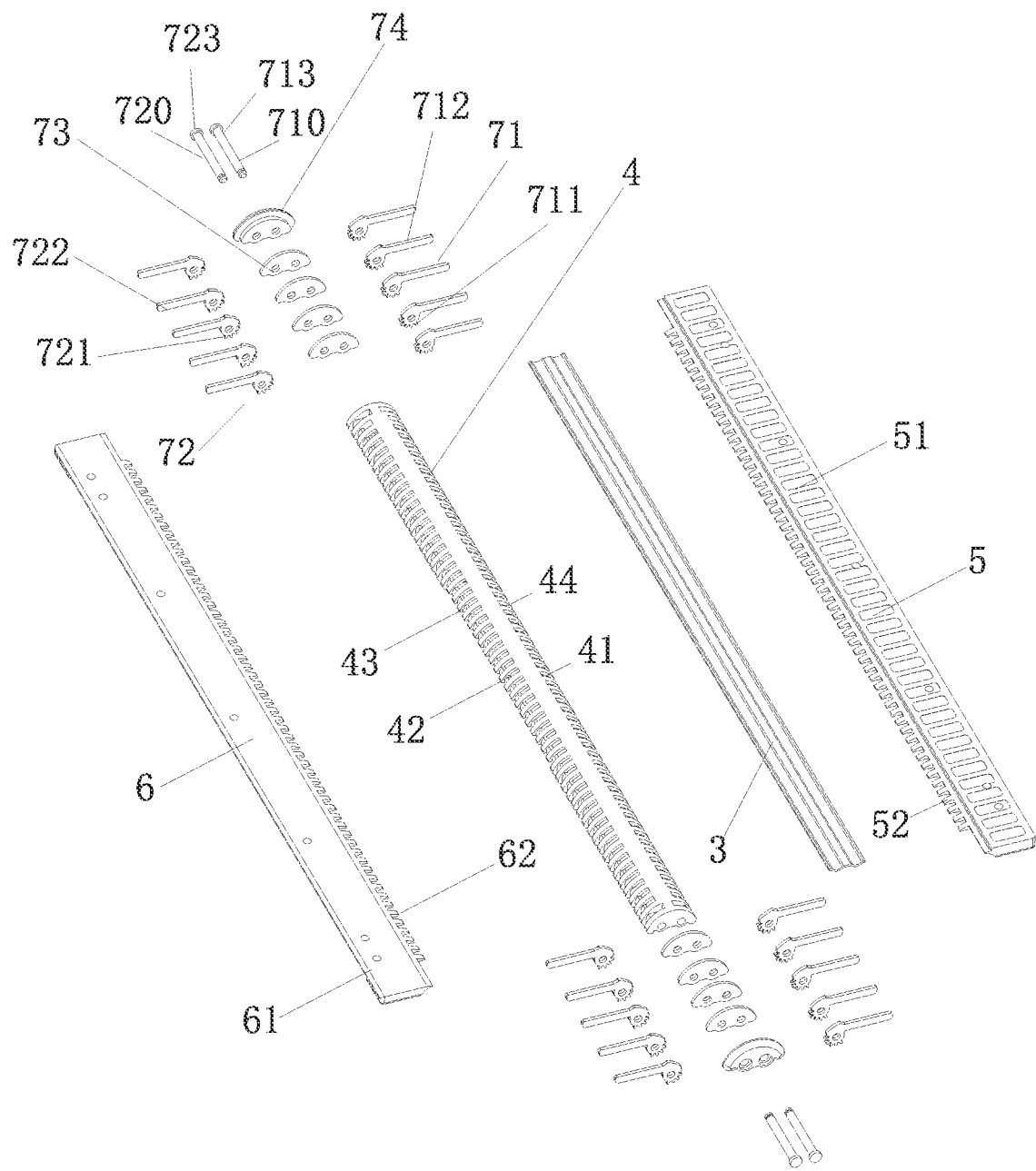
FIG. 5 is an exploded view of a hinge according to an embodiment of the present invention.
Figure 6:
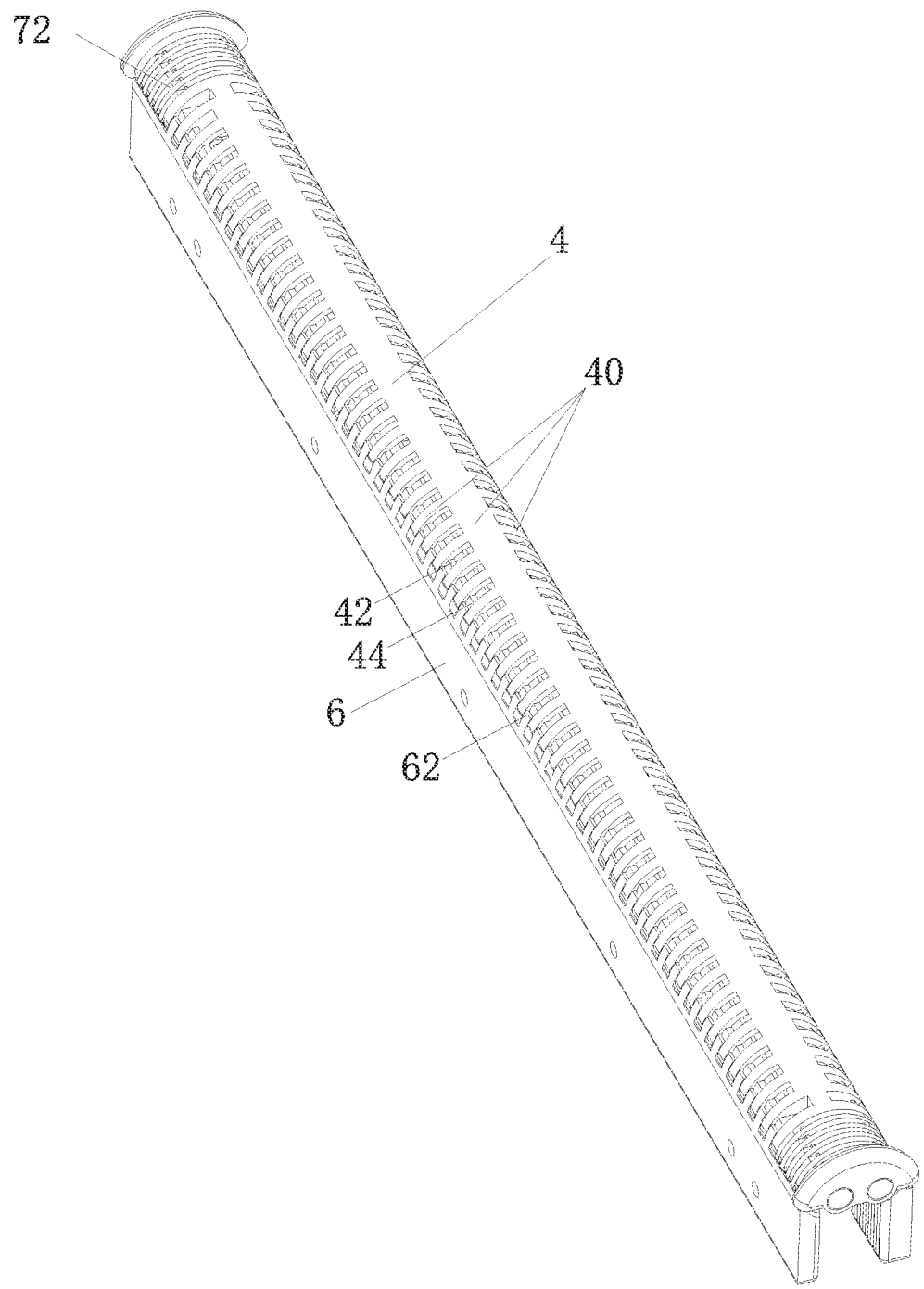
FIG. 6 is a schematic diagram of a hinge in a folded state.
Figure 7:
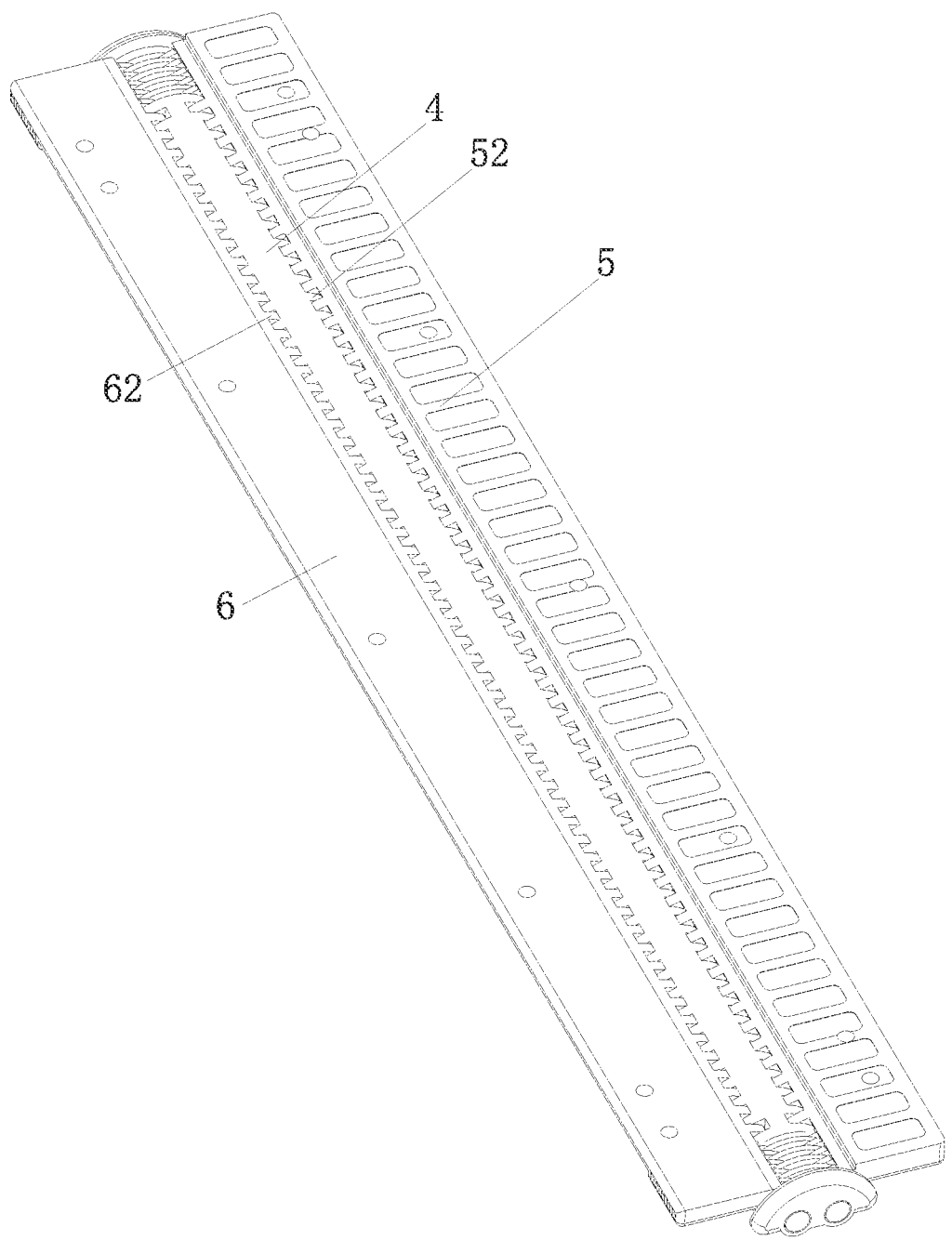
FIG. 7 is a schematic diagram of an outer side of a hinge in a flattened state.
Figure 8:
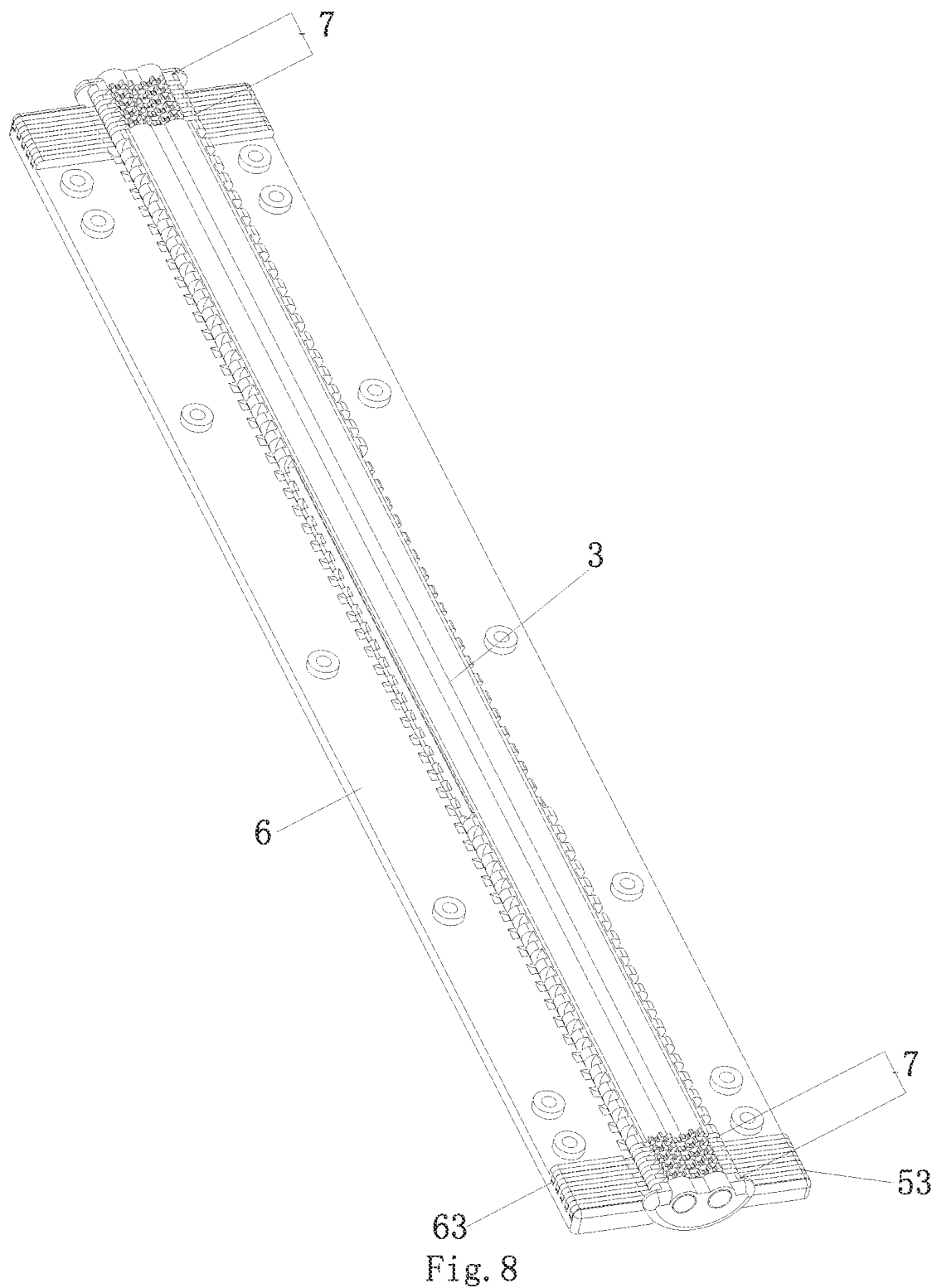
FIG. 8 is a schematic diagram of an inner side of a hinge in a flattened state.
Figure 9:
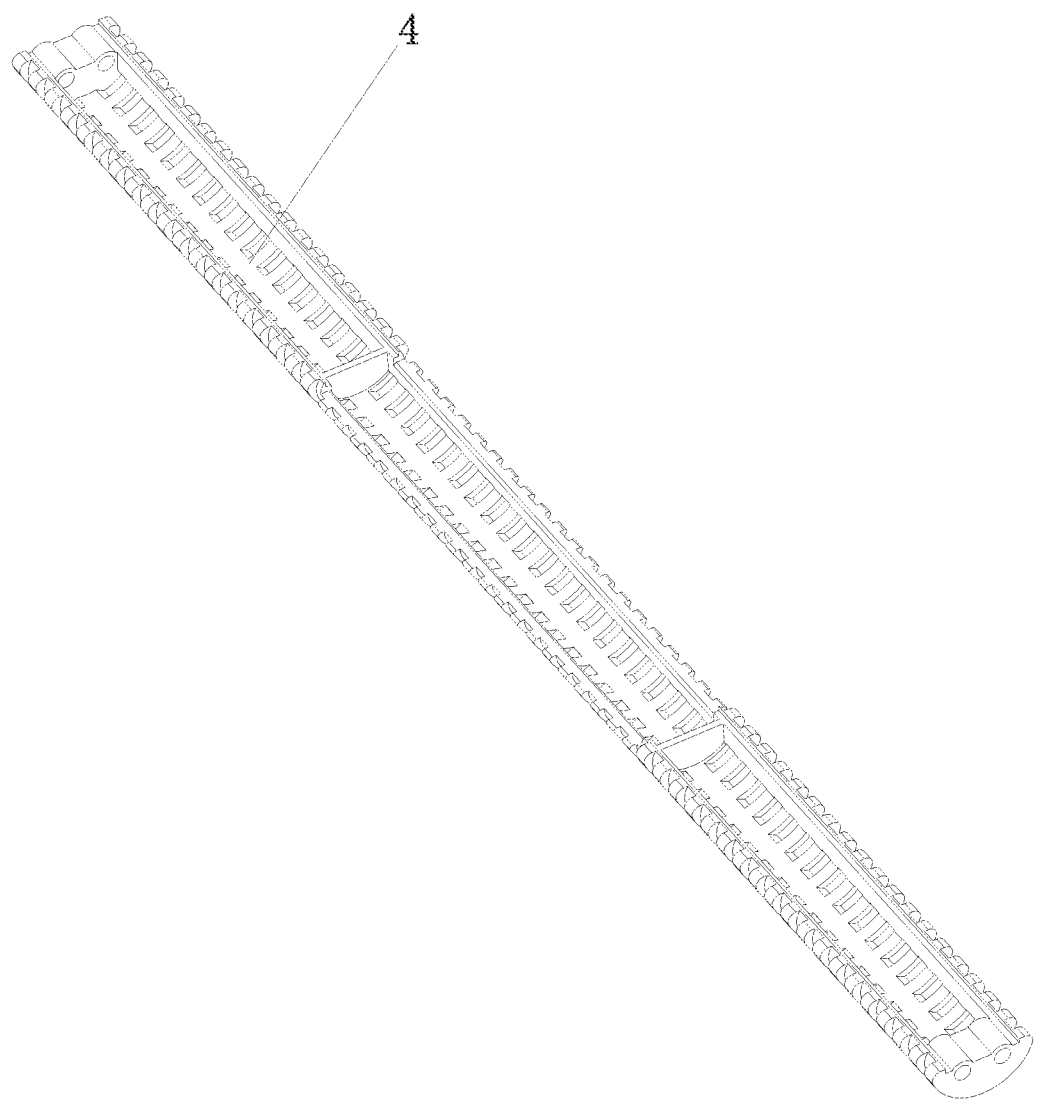
FIG. 9 is a schematic diagram of the inner side of a middle supporting portion.
Figure 10:
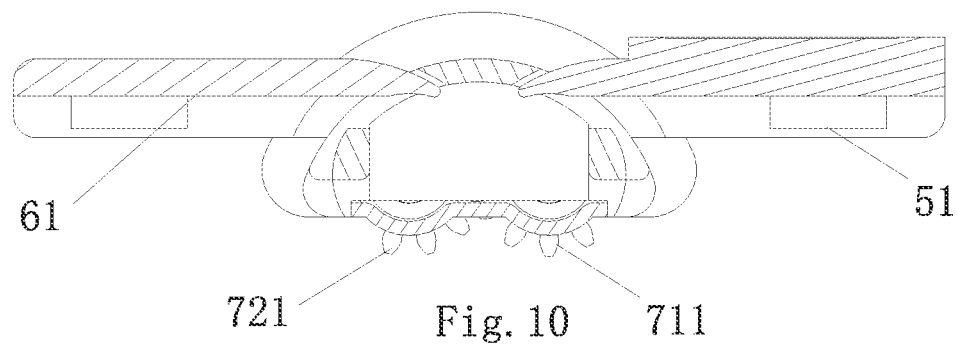
FIG. 10 is a sectional view of a hinge in an flattened state.
Figure 11:
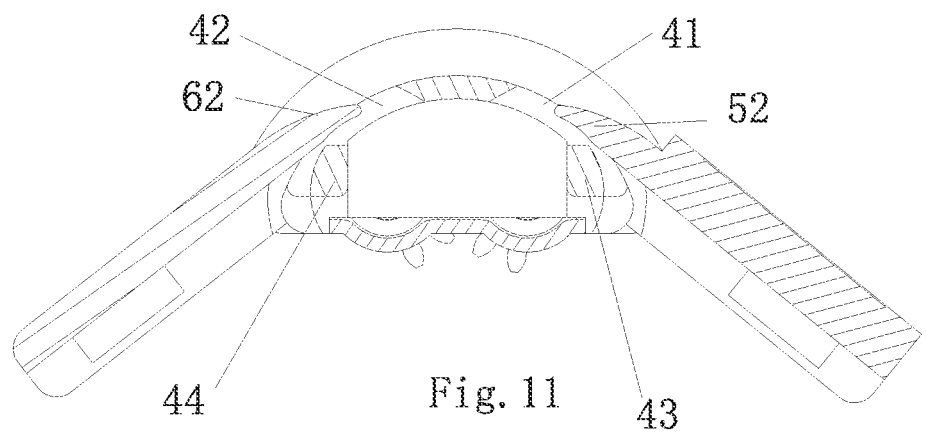
FIG. 11 is a sectional view of a hinge in a state between a fold state and a flattened state.
Figure 12:
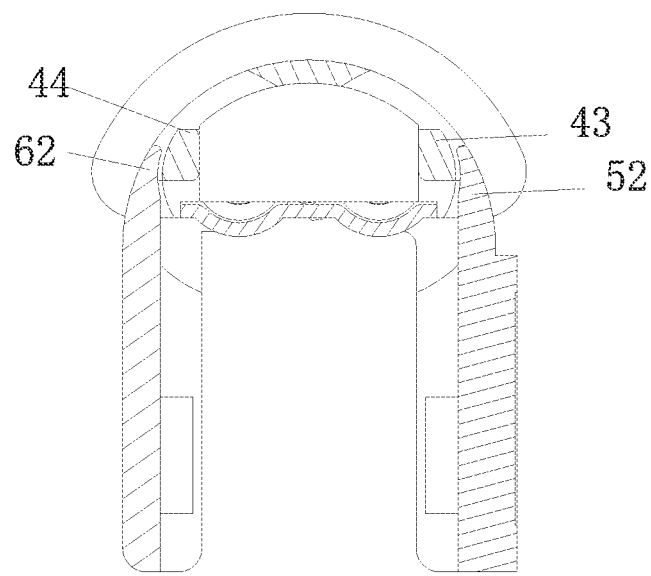
FIG. 12 is a sectional view of a hinge in a folded state.

Referring to attached drawings, an outer flexible screen mobile electronic terminal comprises a first side housing 100 and a second side housing 200. The first side housing 100 and the second side housing 200 are located on the left and right sides of the outer flexible screen mobile electronic terminal respectively when the outer flexible screen mobile electronic terminal is flattened. A flexible screen 300 is arranged on the outer side of the outer flexible screen mobile electronic terminal. The flexible screen supporting plate 201 of the second side housing 200 is arranged as s sliding plate to be slidable. The flexible screen supporting plate 101 of the first side housing 100 is arranged to be fixed. The flexible screen may be a flexible touch screen itself, or a module including the structural reinforcement layer and other accessories.

The outer flexible screen mobile electronic terminal is provided with an elastic mechanism 2, and the sliding plate is connected to the elastic mechanism. The elastic structure can be provided with a compression spring or tension spring and a corresponding connection mechanism or further provided with a guiding structure, and the sliding plate is pushed or pulled towards the second side. As shown in FIGS. 3 and 4, in this embodiment, the elastic structure 2 comprises a mounting base 21 connected to the second side housing, a compression spring 22, a guide rod 23 and a sliding block 24. The sliding block 24 is fixedly connected with the sliding plate, and the sliding block 24 is slidingly connected with the guide rod 23 and supported by the compression spring 22 at the same time. The guide rod 23 is mounted on the mounting base 21, the mounting base 21 is mounted on the second side housing 200, and the compression spring 22 is sleeved outside the guide rod 23.

The outer flexible screen mobile electronic terminal is provided with a composite supporting layer 1 between the first side housing 100 and the second side housing 200, and the composite supporting layer 1 is provided with a first side and a second side located at two opposite sides, respectively. The width of the composite supporting layer 1 matches the width of the flexible screen 300, and occupies or nearly occupies the width of the flexible screen 300. In the width direction, the composite supporting layer 1 may be a single piece. Alternatively, the composite supporting layer 1 may be divided into several segments in this direction, respectively having respective first side and second side or having a common first side and second side. It should be appreciated that for realizing the function of the composite supporting layer, there are no gaps between segments. The composite supporting layer 1 comprises the bendable tensile layer 11 and the bendable and flattenable supporting layer 12 of the tensile layer 11. The tensile layer can be made of metal sheets such as steel sheets, which have tensile, bending and resilience capabilities and are extremely thin, can be only about 0.03 mm, to meet the needs of flexible bending and excellent tensile strength and prevent the composite supporting layer from being pulled off. The tensile layer can be made of metal sheets such as steel sheets, and the tensile layer can also be made of other tensile sheets with high strength, such as nylon, Kevlar, polyester and other woven fabrics. Composite bendable and flattenable supporting layer 12 is provided on the tensile layer, the supporting layer can be made of rubber material, silica gel, resin, leather and other materials, and the tensile layer 11 can be covered on the top surface of the composite supporting layer 1 by bonding, the supporting layer 12 is below the tensile layer, or the tensile layer 11 can be embedded in the supporting layer 12. The length of the supporting layer 12 matches the length of the middle curved part of the flexible screen mobile electronic terminal when folded, and the length is close to or equal to or exceeds the arc length of the entire curved part when the flexible screen mobile electronic terminal is folded. When the mobile electronic terminal is flattened, the length is at least close to the length of the straight line between the flexible screen supporting plate 101 of the first side housing 100 and the flexible screen supporting plate 201 of the second side housing 200, and during the flattening process, the supporting layer 12 can provide the main compressive ability of composite supporting layer 1 to the elastic mechanism.

Both sides of the tension layer 11 is longer than the supporting layer 12, and when the outer flexible screen mobile electronic terminal is folded, the tension layer has a straight line segment on both sides 111 and 112, which can have smoother motion performance. As the first side of the composite supporting layer 1, the first side 111 of the tensile layer is connected to the flexible screen supporting plate 101 of the first side housing 100 or connected to the part that is fixedly connected to the first side housing in the hinge 400 of the outer flexible screen mobile electronic terminal; as the second side of the composite supporting layer 1, the second side 12 of the tensile layer 11 is provided with a part connected to the sliding plate, which is connected to the flexible screen supporting plate 201 of the second side housing 200.

As a preferred embodiment, the tension layer 11 is laid above the supporting layer 12, the lower surface of the first side 111 is connected to the flexible screen supporting plate 101 of the first side housing, and the lower surface of the second side 112 is connected to the flexible screen supporting plate 201 of the second side housing; the upper surface of the tensile layer 11 is connected to the flexible screen in a fit manner. The flexible screen is pasted on the flexible screen supporting plate of the first side housing, the composite supporting layer, and the flexible screen supporting plate of the second side housing. The hinge 400 of the outer flexible screen mobile electronic terminal is provided below the composite supporting layer 1.

It is envisaged that, for the first side, the flexible screen supporting plate 101 of the first side housing 100 can also be arranged as a sliding plate, so that both sides of the composite supporting layer 1 are connected to the sliding part, to achieve the effect of the present invention, but the design will be more complicated. The hinge 400 of the outer flexible screen mobile electronic terminal is arranged between the first side housing 100 and the second side housing 200, to connect the first side housing 100 and the second side housing 200.

The hinge comprises a middle supporting portion 4, a first side connection portion 5 and a second side connection portion 6, a synchronous reverse rotation connecting mechanism. The first side connection portion 5 and the second side connection portion 6 are rotatably mounted on the first side and the second side of the middle supporting portion respectively.

The outer side of the middle supporting portion 4 is provided with an arc 40 fitting the bending of the flexible screen, and gratings 41 and 42 are provided on the first side and the second side thereof respectively; the first side connection portion 5 and the second side connection portion 6 are configured to be in the shape of a comb. The comb shape of the first side connection portion 5 comprises a fixed connection portion 51 and combs 52 that are inserted into the gratings 41 of a first side of a middle connection portion respectively, the comb shape of the second side connection portion 6 comprises a fixed connection portion 61 and combs 62 that are inserted into the gratings 42 of a second side of the middle connection portion respectively. Further, limiting portions 43 and 44 may be provided in the gratings 41 and 42 respectively, and the limiting portions 43 and 44 are connected between the gratings walls to further strengthen the structural strength. Meanwhile, it is possible to support the combs 52 and 62 respectively when the outer flexible screen mobile terminal is in a flattened state, so as to support the first side connection portion 5 and the second side connection portion 6 on the side of the comb, and it is also possible to limit and protect the combs 52 and 62 respectively when the outer flexible screen mobile terminal is in a folded state.

The first side connection portion 5 and the second side connection portion 6 can be provided with or without a flexible screen supporting portion according to needs. The fixed connection portion 51 of the first side connection portion and the fixed connection portion 61 of the second side connection portion both are provided with the parts that are connected to the first side housing 100 and the second side housing 200. For application to the outer flexible screen mobile electronic terminal, it is always desirable that the first side connection portion and the second side connection portion tend to be thinner while ensuring the strength of the parts connected to the first side housing 100 and the second side housing 200. Therefore, in an embodiment, the fixed connection portion 51 and the fixed connection portion 61 are overall in a flat shape, one side is collectively connected to the comb, and the other side is inserted into the first side housing 100 and the second side housing 200 respectively for connection or stacking on the connection portion of the first side housing 100 and the second side housing 200 for connection. In another embodiment, on the one hand, the first side connection portion 5 and the second side connection portion 6 are collectively connected to the respective combs 52 and 62, and on the other hand, a plurality of "tentacles" are provided as the fixed connection portions, to be connected with the first side housing 100 and the second side housing 100 respectively.

The length of the comb is determined according to the size of the outer flexible screen mobile electronic terminal, provided that the bending and flattening of the flexible screen or the cushion layer of the flexible screen above the hinge are not interfered. It is preferable that the matching between the combs and the grating walls of the middle supporting portion in the length direction of the middle supporting portion 4 is closer to each other without affecting the hinge movement, so that the strength of the middle supporting portion 4, the first side connection portion 5 and the second side connection portion 6 in an overall elongated shape can be better improved, to improve the deformation resistance.

The length of the middle supporting portion matches the length of the outer flexible screen mobile electronic terminal in the length direction, which can be substantially equal to the dimension of the flexible screen in the length direction, or slightly shorter; and a synchronous reverse rotation connecting mechanism or other important mechanisms are provided for the hinge of the outer flexible screen mobile electronic terminal at both ends. The existence of gratings and the matching between gratings and combs enables the middle supporting portion 4 to directly fit the arc of the bending of the flexible screen, avoiding the complexity of assembly and control brought by the previous solution of multiple supporting rods, and meanwhile, taking the weight and intensity of the structure into account. It should be appreciated that the dimensions of the gratings in the length direction of the middle supporting portion may not be exactly the same but different, and the corresponding situation is also applicable to the combs.

In addition to the whole part, the middle supporting portion can also be formed by splicing or connecting several segments and sheets in the length direction thereof. When the first side connection portion 5 and the second side connection portion 6 are implemented, in addition to the solution of whole block, the solutions of two blocks or a combination of several blocks can be used.

In the figures, the reference numeral 3 is the decorative plate inside the hinge, and the decorative plate 3 is connected with the middle connection portion.

The first side connection portion 5 and the second side connection portion 6 are rotatably mounted on the first side and the second side of the middle supporting portion 4 by the synchronous reverse rotation connecting mechanism 7.

The synchronous reverse rotation connecting mechanism is a sheet-like superimposed structure, which comprises a plurality of first synchronous connecting pieces 71 with gears 711 and a plurality of second synchronous connecting pieces 72 with gears 721. The first synchronous connecting piece 71 is provided with an arm end 712 that is connected to the connecting groove 53 on the back of the first side connection portion 5, and the second synchronous connecting piece 72 is provided with an arm end 722 that is connected to the connecting groove 63 on the back of the second side connection portion 6. The first synchronous connecting pieces 71 and the second synchronous connecting pieces 72 are provided in pairs, and the gear 771 and gear 721 are meshed or connected through an intermediate gear; the gears 711 of the first synchronous connecting pieces and the gears 721 of the second synchronous connecting pieces are respectively connected rotatably to the middle supporting portion 4 through gear shafts 710 and 720, and a supporting spacer 73 is provided between the adjacent pairs of the first synchronous connecting pieces 71 and the second synchronous connecting pieces 72, the outer side of the supporting spacer 73 is provided with an arc fitting the bending of the flexible screen, and the external contour can be made same as the middle supporting portion. The ends of the gear shafts 710 and 720 are provided with an axial limit structure, for example, protruding parts 713, 723, to axially limit the synchronous connecting pieces and the supporting spacer 73.

Regarding the assignment of fixation and rotation, in a preferred embodiment, the gear shafts 710, 720 are fixedly connected to the middle supporting portion 3; and the first synchronous connecting piece 71 and the second synchronous connecting piece 72 can be rotated relative to the gear shaft, the supporting spacer 73 is provided with a gear shaft hole for the gear shaft to pass through and be fixedly connected to the supporting spacer. A fixed end plate 74 can be arranged between the outermost synchronous connecting piece and the protruding part, and the fixing method is the same as that of the supporting spacer 73.

A synchronous reverse rotation connecting mechanisms are respectively provided outside the two ends of the middle supporting portion.

The solution of connection of the synchronous connecting piece to the first side connection portion 5 and the second side connection portion 6 is not limited to the above structure, and other parts or connection shapes can also be provided for connection by welding, screw connection, snap connection, riveting, and so on.

As an alternative solution, the first side connection portion 5 and the second side connection portion 6 can also be directly rotationally connected with the middle supporting portion 4 without passing through the synchronous reverse rotation connecting mechanism, and then additionally connected with the synchronous reverse rotation connecting mechanism arranged on the middle supporting portion.

In addition, the structural form of the synchronous reverse rotation connecting mechanism can also adopt other alternative solutions, such as a cam structure, a connecting belt structure.

In this embodiment, the flexible screen supporting plate 201 of the second side housing 200 is arranged as a sliding plate to be slidable. Reference numeral 2 is an elastic mechanism mounted in the second housing. The sliding plate is connected to the elastic mechanism 2, and the elastic mechanism 2 makes the sliding plate always have a tendency to slide towards the end of the second side. The flexible screen supporting plate 101 of the first side housing 100 is arranged to be fixed, and the first side connection portion is also connected to the first side of the composite supporting layer of the outer flexible screen mobile electronic terminal located between the first side housing and the second side housing. The fixed connection portion 51 of the first side connection portion is provided with a top surface, and the top surface is used for connecting to the first side of the composite supporting layer. It can be envisaged that, for the first side, the flexible screen supporting plate 101 of the first side housing 100 can also be arranged as a sliding plate, at this time, the first side connection portion does not need to be connected to the first side of the composite supporting layer any longer. For the second side, the flexible screen supporting plate 201 can also be arranged as a fixed plate. No matter what the change is, the hinge of the present invention can always be adapted to the outer flexible screen mobile electronic device, to achieve the above technical effects.

When one side is sliding and the other side is fixed, as a structure that is more convenient to manufacture and assemble, the hinge and the composite supporting layer can be connected to form an assembly. The first side of the composite supporting layer is connected to the fixed connection portion of the first side connection portion, and the second side is connected to a sliding part such as a sliding plate.

The above description only describes the specific embodiments of the present invention, but the structural features of the present invention are not limited thereto. It is foreseeable that the motion mechanism of the present invention can be applied to various mobile terminals with outwardly folded flexible screens. Any changes or modifications made by any person skilled in the art within the field of the present invention should fall within the scope of protection of the present invention.

The invention claimed is:

1. An outer flexible screen mobile electronic terminal, comprising a hinge, a first side housing and a second side housing, and a flexible screen is arranged on the outer side of the outer flexible screen mobile electronic terminal, wherein a composite supporting layer of the flexible screen is provided between a first side housing and a second side housing of the outer flexible screen mobile electronic terminal, a supporting plate of the flexible screen is provided on the first side housing and the second side housing respectively, and the flexible screen supporting plate of the second side housing is arranged as a sliding plate; the composite supporting layer comprises a bendable tensile layer and a bendable and flattenable supporting layer of the bendable tensile layer, the composite supporting layer is provided with a first side and a second side on two opposite sides respectively, so as to be connected to the first side and the second side of the outer flexible screen mobile electronic terminal, respectively, the second side of the composite supporting layer is connected with the sliding plate, and the sliding plate is connected with an elastic mechanism that pushes or pulls the sliding plate toward the second side; the flexible screen and the flexible screen supporting plate of the first side housing, the composite supporting layer, and the flexible screen supporting plate of the second side housing are connected;

the hinge is located below the composite supporting layer, and comprises a middle supporting portion, a first side connection portion, a second side connection portion and a synchronous reverse rotation connecting mechanism, the first side connection portion and the second side connection portion are rotatably mounted on a first side and a second side of a middle supporting portion respectively, the outer side of the middle supporting portion is provided with an arc fitting the bending of the arc of the flexible screen, and the first side and the second side of the middle supporting portion are respectively provided with gratings, the first side connection portion and the second side connection portions are configured to be in the shape of a comb, the comb shape of the first side connection portion comprises a fixed connection portion and combs that are inserted into the gratings of a first side of a middle connection portion respectively, the comb shape of the second side connection portion comprises a fixed connection portion and combs that are inserted into the gratings of a second side of the middle connection portion respectively, the first side connection portion is connected with the second side connection portion by the synchronous reverse rotation connecting mechanism configured to rotate in reverse synchronously.

2. The outer flexible screen mobile electronic terminal according to claim 1, wherein both sides of the bendable tensile layer are longer than the supporting layer, the first side of the bendable tensile layer is used as the fixed side to connect with a fixed part, and the second side of the bendable tensile layer is provided with a part connecting to the sliding plate.

3. The outer flexible screen mobile electronic terminal according to claim 1, wherein the bendable tensile layer is laid above the supporting layer.

4. The outer flexible screen mobile electronic terminal according to claim 1, wherein a width of the composite supporting layer matches a width of the flexible screen.

5. The outer flexible screen mobile electronic terminal according to claim 1, wherein both sides of the bendable tensile layer are longer than the composite supporting layer, and when the outer flexible screen mobile electronic terminal is folded, the bendable tensile layer has a line segment on both sides, and the first side of the bendable tensile layer is connected to the flexible screen supporting plate of the first side housing or connected to a part of the hinge that is fixedly connected to the first side housing, and the second side of the bendable tensile layer is connected to the flexible screen supporting plate of the second side housing.

6. The outer flexible screen mobile electronic terminal according to claim 1, wherein the bendable tensile layer is laid above the supporting layer, the lower surface of the first side of the bendable tensile layer is connected to the flexible screen supporting plate of the first side housing, and the lower surface of the second side of the bendable tensile layer is connected to the flexible screen supporting plate of the second side housing, and the upper surface of the bendable tensile layer is connected to the flexible screen in a fit manner.

7. The outer flexible screen mobile electronic terminal according to claim 1, wherein a first side of the composite supporting layer is connected to the flexible screen supporting plate of the first side housing or connected to a part of the hinge that is fixedly connected to the first side housing, the second side of the bendable tensile layer is connected to the flexible screen supporting plate of the second side housing.

8. The outer flexible screen mobile electronic terminal according to claim 1, wherein in the hinge, the first side connection portion and the second side connection portion are rotatably mounted on the first side and the second side of the middle supporting portion through the synchronous reverse rotation connecting mechanism.

9. The outer flexible screen mobile electronic terminal according to claim 1, wherein in the hinge, the fixed connection portion of the first side connection portion and the fixed connection portion of the second side connection portion are respectively provided with parts that are connected to the first side housing and the second side housing of the outer flexible screen mobile electronic terminal.

10. The outer flexible screen mobile electronic terminal according to claim 9, wherein the fixed connection portion of the first side connection portion is provided with a top surface, and the top surface is connected to the first side of the composite supporting layer.

11. The outer flexible screen mobile electronic terminal according to claim 1, wherein the length of the middle supporting portion matches the length of the outer flexible screen mobile electronic terminal in the length direction.

12. The outer flexible screen mobile electronic terminal according to claim 1, wherein the synchronous reverse rotation connecting mechanism is a sheet-like superimposed structure, which comprises a plurality of first synchronous connecting pieces with gears and a plurality of second synchronous connecting pieces with gears, the first synchronous connecting pieces are connected to the first side connection portion, the second synchronous connecting pieces are connected to the second side connection portion, the first synchronous connecting pieces and the second synchronous connecting pieces are provided in pairs, and the gears thereof are meshed or connected through an intermediate gear;

the gears of the first synchronous connecting pieces and the gears of the second synchronous connecting pieces are respectively connected rotatably to the middle supporting portion through gear shafts thereof, and a supporting spacer is provided between the adjacent pairs of the first synchronous connecting pieces and the second synchronous connecting pieces, the outer side of the supporting spacer is provided with an arc fitting the bending of the flexible screen, and the end of the gear shafts is provided with an axial limit structure;

the synchronous reverse rotation connecting mechanisms are respectively provided outside the two ends of the middle supporting portion.

13. The outer flexible screen mobile electronic terminal according to claim 12, wherein the gear shafts are fixedly connected to the middle supporting portion, the first synchronous connecting pieces and the second synchronous connecting pieces are capable of rotating relative to the gear shafts, the supporting spacer is provided with a gear shaft hole for the gear shafts to pass through and be fixedly connected to the supporting spacer.

14. A hinge assembly of the outer flexible screen mobile electronic terminal, comprising the hinge and the composite supporting layer of claim 1, wherein the first side of the composite supporting layer is connected to the fixed connection portion of the first side connection portion, and the second side of the composite supporting layer is connected to a sliding part.

* * * * *